United States Patent
Bruck et al.

(10) Patent No.: US 9,446,480 B2
(45) Date of Patent: Sep. 20, 2016

(54) REINFORCED CLADDING

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 347 days.

(21) Appl. No.: 14/202,731

(22) Filed: Mar. 10, 2014

(65) Prior Publication Data

US 2016/0114430 A1 Apr. 28, 2016

(51) Int. Cl.

| | |
|---|---|
| *B23K 26/342* | (2014.01) |
| *B23K 26/144* | (2014.01) |
| *B23K 26/00* | (2014.01) |
| *B23K 35/368* | (2006.01) |
| *B23K 35/362* | (2006.01) |
| *B23K 9/04* | (2006.01) |
| *B23K 10/02* | (2006.01) |
| *B23K 15/00* | (2006.01) |
| *B23K 26/34* | (2014.01) |
| *C23C 26/02* | (2006.01) |

(Continued)

(52) U.S. Cl.
CPC .............. *B23K 26/342* (2015.10); *B23K 9/042* (2013.01); *B23K 9/044* (2013.01); *B23K 10/027* (2013.01); *B23K 15/0093* (2013.01); *B23K 26/0006* (2013.01); *B23K 26/144* (2015.10); *B23K 26/32* (2013.01); *B23K 26/322* (2013.01); *B23K 26/34* (2013.01); *B23K 35/362* (2013.01); *B23K 35/368* (2013.01); *C22C 26/00* (2013.01); *C22C 47/08* (2013.01); *C22C 49/14* (2013.01); *C23C 24/103* (2013.01); *C23C 26/02* (2013.01); *B23K 2201/001* (2013.01); *B23K 2201/06* (2013.01); *B23K 2201/34* (2013.01); *B23K 2203/08* (2013.01); *B23K 2203/50* (2015.10); *C22C 2026/002* (2013.01); *F01D 5/005* (2013.01); *F05D 2230/31* (2013.01); *F05D 2300/224* (2013.01)

(58) Field of Classification Search
CPC .............. B23K 26/342; B23K 26/144; B23K 26/0006; B23K 35/362; B23K 35/368
USPC ........................ 219/121.66, 121.85; 264/109
See application file for complete search history.

(56) References Cited

U.S. PATENT DOCUMENTS

| | | | |
|---|---|---|---|
| 4,752,537 A | 6/1988 | Das | |
| 5,248,475 A * | 9/1993 | Feldstein | ................ B22F 1/025 419/35 |

(Continued)

FOREIGN PATENT DOCUMENTS

CN          1532304          9/2009

OTHER PUBLICATIONS

Wu et al., "Vacuum brazing of carbon nanotube bundles", Elsevier B V, Materials Letters, vol. 62, pp. 4486-4488, 2008.

(Continued)

*Primary Examiner* — Samuel M Heinrich

(57) ABSTRACT

A method for forming a reinforced cladding on a superalloy substrate. The method includes forming a melt pool including a superalloy material and a plurality of discrete carbon reinforcing structures on the superalloy substrate via application of energy from an energy source. The method further includes cooling the melt pool to form a reinforced cladding including the superalloy material and the carbon reinforcing structures on the substrate.

15 Claims, 2 Drawing Sheets

(51) Int. Cl.
*B23K 26/32* (2014.01)
*C23C 24/10* (2006.01)
*C22C 26/00* (2006.01)
*C22C 47/08* (2006.01)
*C22C 49/14* (2006.01)
*F01D 5/00* (2006.01)

(56) References Cited

U.S. PATENT DOCUMENTS

| | | | |
|---|---|---|---|
| 5,902,498 A | 5/1999 | Shengzhong | |
| 6,460,599 B1* | 10/2002 | Naik | B22C 1/00 |
| | | | 164/122.1 |
| 7,326,892 B1 | 2/2008 | Allan | |
| 7,416,108 B2 | 8/2008 | Philip | |
| 7,811,662 B2* | 10/2010 | Jabado | B23K 1/0018 |
| | | | 428/292.1 |
| 7,946,467 B2 | 5/2011 | Cretegny | |
| 8,342,386 B2 | 1/2013 | Amancherla | |
| 8,459,159 B2* | 6/2013 | Jessen | B26D 7/18 |
| | | | 83/123 |
| 2003/0068518 A1* | 4/2003 | Ando | B23K 9/04 |
| | | | 428/608 |
| 2006/0162817 A1 | 7/2006 | Englert | |
| 2010/0086702 A1 | 4/2010 | Blankenship | |
| 2010/0126631 A1 | 5/2010 | Suh | |
| 2010/0193574 A1 | 8/2010 | Schoonover | |
| 2012/0181255 A1 | 7/2012 | Bruck | |
| 2013/0001278 A1 | 1/2013 | Amancherla | |
| 2013/0136868 A1 | 5/2013 | Bruck | |
| 2013/0140279 A1 | 6/2013 | Ahmed | |
| 2013/0142965 A1 | 6/2013 | Ahmed | |
| 2013/0260178 A1 | 10/2013 | Bruck | |
| 2013/0323533 A1 | 12/2013 | DiMascio | |
| 2014/0044991 A1 | 2/2014 | Bruck | |

OTHER PUBLICATIONS

Huang, et al , "Wetting and the reaction of multiwalled carbon nanotube-reinforced composite solder with a copper substrate", Science of Engineering of Composite Materials pp. 1-6, ISSN (Online) 2191-0359, ISSN (Print) 0792-1233 DOI 10 1515/secm, Apr. 2013 (Abstract).

Shang, et al , "Highly Twisted Double-Helix Carbon Nanotube Yarns", ACS NANA Publications, vol. 7 (2), 2013, pp. 1446-1453, Publication Dec. 30, 2012.

* cited by examiner

REINFORCED CLADDING

FIELD OF THE INVENTION

This invention relates to the field of metals joining, and more particularly to an additive manufacturing process utilizing a plurality of carbon reinforcing structures.

BACKGROUND OF THE INVENTION

Blades and vanes for land-based power generation and for aerospace applications are typically formed from superalloy materials. The term "superalloy" is used herein as it is commonly used in the art to refer to a highly corrosion-resistant and oxidation-resistant alloy that exhibits excellent mechanical strength and resistance to creep even at high temperatures. Superalloys typically include a high nickel or cobalt content. Exemplary superalloys include, but are not limited to, alloys sold under the trademarks and brand names Hastelloy, Inconel alloys (e.g. IN 738, IN 792, IN 939), Rene alloys (e.g., Rene N5, Rene 41, Rene 80, Rene 108, Rene 142, Rene 220), Haynes alloys, Mar M, CM 247, CM 247 LC, C263, 718, X-750, ECY 768, 262, X45, PWA 1483 and CMSX (e.g. CMSX-4) single crystal alloys, GTD 111, GTD 222, MGA 1400, MGA 2400, PSM 116, CMSX-8, CMSX-10, PWA 1484, IN 713C, Mar-M-200, PWA 1480, IN 100, IN 700, Udimet 600, Udimet 500 and titanium aluminide.

Since the development of superalloy materials, various strategies have been employed to provide mechanical strength to the materials to improve the lifetimes thereof. Some elements can provide strength in solid solution. Examples include tantalum, tungsten and rhenium. Carbide precipitations can also add to strength. Elements forming carbides include titanium, tantalum, hafnium and niobium. Most particularly, superalloy materials may be strengthened through the formation of a precipitate phase known as gamma prime ($\gamma'$). This phase has the basic composition $Ni_3(Al,Ti)$. If properly sized and of sufficient volume fraction, this phase offers significant strengthening—most particularly to nickel based superalloys. Some superalloys are also strengthened by another precipitate known as gamma double prime. This precipitate is of the composition $Ni_3Nb$, and is important for strengthening some nickel and nickel/iron-based superalloys. Gamma prime phases have an ordered crystalline lattice, which aids in providing added strength to the material. In addition, single crystal solidification techniques have been developed for superalloys that enable grain boundaries to be entirely eliminated from a casting, as well as increase the volume fraction of the $\gamma'$ precipitates. Alternatively, superalloys may be directionally solidified so as to include only longitudinally directed grains for added strength.

Generally, superalloy materials are among the most difficult materials to weld due to their susceptibility to weld solidification cracking and strain age cracking under the conditions (e.g., high temperature) necessary to weld and heat treat such materials. Further, when cladding on a superalloy material, it is appreciated that unless additional steps are taken, the cladding may not have the same physical properties, e.g., mechanical strength, as the underlying substrate.

BRIEF DESCRIPTION OF THE DRAWINGS

The invention is explained in the following description in view of the drawings that show.

DETAILED DESCRIPTION OF THE INVENTION

The present inventors have developed an additive manufacturing process for joining, repairing, and/or enhancing traditionally difficult to weld superalloy substrate materials that provides added strength to the final cladding product. Advantageously, embodiments provide a reinforced cladding comprising a superalloy material and a plurality of discrete carbon reinforcing structures (hereinafter "carbon reinforcing structures") dispersed therein for providing added stability to the final cladding. During processes for forming the reinforced cladding, the carbon reinforcing structures do not melt or are not structurally damaged even when exposed to the high energies utilized during laser melting, for example. In certain embodiments, the carbon reinforcing structures are added to a powder material comprising at least a superalloy material, which is then melted (carbon structures excepted) and cooled, passively or actively, to form the cladding.

Figure 1:
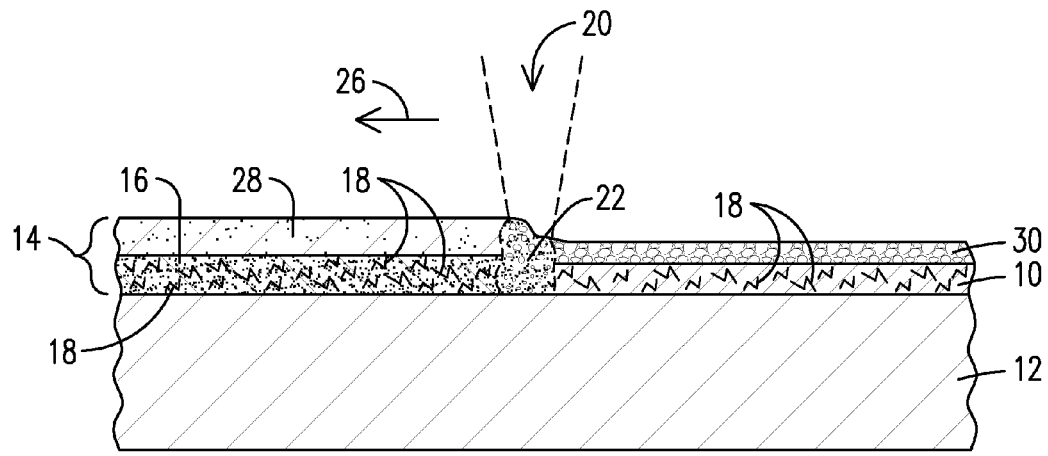
FIG. 1 illustrates a cladding process using a multi-layer powder comprising carbon reinforcing structures in accordance with an aspect of the present invention.

In other embodiments, the carbon reinforcing structures are delivered to a melt pool comprising at least the melted superalloy material after the pool has been established. To date, reinforced fibers or other filler materials have not been used in the welding or cladding of superalloy materials because such reinforcing materials would generally not survive the temperatures involved in welding or cladding without being melted or structurally damaged. Aspects of the present invention avoid this issue by controlling energy input and/or by inserting the carbon material into the melt pool after the energy source is removed, or shortly before the energy source is removed Referring to the figures, FIG. 1 illustrates a process where a layer of cladding 10 of a superalloy material has been deposited onto a superalloy substrate 12 at room temperature without any preheating of substrate 12 or the use of a chill plate. The substrate 12 may form part of a gas turbine engine blade, for example. A layer of powder 14 is provided which comprises at least a superalloy material, such as superalloy powder 16. In certain embodiments, the powder 14 comprises a plurality of carbon reinforcing structures 18 dispersed within the superalloy powder 16. The powder 14 may be pre-placed on the substrate 12 as shown and an energy source 20, such as a laser beam, delivers energy to melt the powder 14 as the substrate is moved with respect to the energy source 20, such as in the direction shown by arrow 26. Alternatively, the substrate 12 may be kept stationary as the energy source 20 is moved over the substrate 12 to melt the powder 14. In any case, a melt pool 22 is formed. When cooled, the melt pool 22 forms the cladding 10 comprising the carbon reinforcement structures 18.

Advantageously, the cladding 10 is stabilized via the inclusion of the plurality of carbon reinforcement structures 18. The carbon reinforcement structures 18 may be introduced into the powder material 14 and/or melt pool 22 by any suitable method such that the carbon reinforcement structures 18 are dispersed within in the solid cladding 10. The carbon reinforcement structures 18 maintain their structural integrity under the conditions of the processes described herein, including within the melt pool 22, such that once the melt pool 22 solidifies, the carbon reinforcing structures 18 provide added stability and structural integrity to the cladding 10.

It is appreciated that the carbon reinforcing structures are understood to be "discrete" elements, e.g., particles, fibers, and the like, which are introduced into the melt pool in contrast to trace or smaller amounts of carbon that may be found in the superalloy material. In certain embodiments, the distribution of carbon reinforcement structures 18 in the cladding 10 is substantially homogenous. In other embodiments, the distribution of carbon reinforcing structures 18 is substantially non-homogenous, which may actually further increase the mechanical strength of the cladding 10.

The carbon reinforcing structures 18 may be formed from any suitable carbon material. In one embodiment, the carbon structures 18 comprise a carbon nanotube from the fullerene structure family. Fullerenes are molecules of varying sizes composed entirely of carbon, which take the form of a hollow sphere, ellipsoid, or tube. Carbon nanotubes are known to have extraordinary mechanical strength and high melting points of up to 3000° C. In certain embodiments, the carbon nanotubes are cylindrical-shaped, and at least one end is capped with a hemisphere of the buckyball structure. When provided, the carbon nanotubes may be single-wall or multi-wall nanotubes. The nanotubes may be produced utilizing any known procedure known in the art, including but not limited to a carbon-arc process, electric arc discharge, laser vaporization, laser ablation, or a deposition process, such as chemical vapor deposition (CVP).

In another embodiment, the carbon reinforcing structures 18 may comprise carbon fibers or a carbon yarn material. For example, the carbon reinforcing structures 18 may comprise a nanoyarn material. Advantageously, nanoyarns provide a longer network of reinforcing carbon structures 18 relative to individual particles alone when additional reinforcement is desired. In a particular embodiment, the nanoyarn comprises a highly-twisted double-helix carbon nanotube yarn as described in ACS Nano, 2013, 7 (2), pp 1446-1453. Recently, researchers found that carbon nanotubes can be self-assembled into a stable double-helix structure by a controlled over-twisting process to produce these nanoyarns. These double-helix nanoyarns provide increased elasticity relative to other carbon nanoyarns.

In yet another embodiment, the carbon reinforcing structures 18 may comprise carbon nanobuds. Carbon nanobuds are another allotrope of carbon, wherein fullerene-like "buds" are covalently attached to the outer sidewalls of corresponding carbon nanotubes. In a particular embodiment, the carbon reinforcing structures 18 comprise cylindrical-shaped carbon nanotubes having one or more spherical carbon structures attached thereto to form the carbon nanobud structures.

In still another embodiment, the carbon reinforcing structures 18 may comprise graphene structures. Graphene is also an allotrope of carbon, wherein carbon atoms are arranged in a regular hexagonal pattern. Typically, graphene is a one-atom thick layer of the mineral graphite.

In still another embodiment, the carbon reinforcing structures 18 comprise a diamond-like material. The diamond-like material may be a coating on a non-carbon material in certain embodiments. For example, the carbon reinforcing structures 18 may comprise particles having a diamond-like coating thereon, such as silicon (Si) particles coated with a diamond-like coating.

It is appreciated that the carbon reinforcing structures 18 may comprise a relatively uniform size distribution or may comprise a mixture of different sized carbon structures of the same or different materials. In an embodiment, the carbon reinforcing structures 18 comprise first carbon reinforcing structures of a first dimension and second carbon structures of a second dimension smaller than the first dimension. For example, the carbon reinforcing structures 18 may comprise a mixture of carbon nanotubes and graphene structures, or a mixture of carbon nanotubes and nanoyarns. While not wishing to be bound by theory, the different-sized carbon structures 18 may stabilize the cladding 10 on different scales and against different damage mechanisms.

Thus, in one embodiment, the carbon reinforcement structures 18 comprise a member selected from the group consisting of a fullerene structure, a carbon yarn, a carbon fiber, a carbon nanobud, a graphene structure, a diamond-like material, and a combination thereof. In certain embodiments, the carbon reinforcing structures are also primarily nanosized structures having a largest dimension that is less than 1000 nm in size. In other embodiments, the carbon reinforcing structures are macro-sized (have a largest dimension that is at least 1000 nm (1 micron) in size. The macro structures may be more preferable for larger scale additive manufacturing processes where multiple layers of a cladding 10 are applied to a substrate. The carbon reinforcing structures 18 may be provided in any suitable amount in the cladding 10 to provide the desired degree of added stability to the cladding 10. In an embodiment, the carbon reinforcing structures 18 are provided in a weight percentage (wt %) of 0.01-90 wt %, and in particular embodiments, 5 to 25 wt % of the cladding 10.

The substrate 12 may comprise any material with which would benefit from the additive manufacturing processes described herein. Typically, the substrate 12 comprises a superalloy material as described herein. In particular embodiments, the substrate 12 comprises a superalloy material characterized as being outside a zone of weldability as defined on a graph of superalloys plotting titanium content versus aluminum content, wherein the zone of weldability is upper bounded by a line intersecting the titanium content axis at 6 wt. % and intersecting the aluminum content axis at 3 wt. %.

Figure 2:
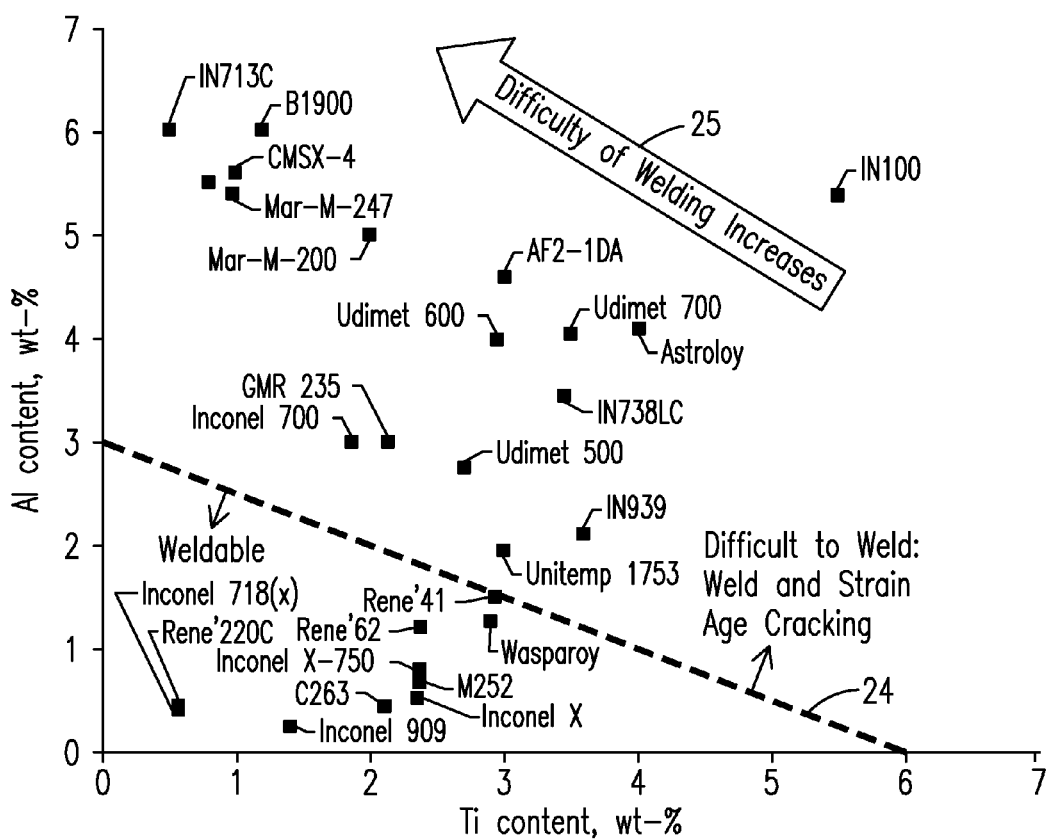
FIG. 2 illustrates a prior art chart showing the relative weldability of various superalloys.

FIG. 2 illustrates such a graph illustrating the relative weldability of various alloys as a function of their aluminum and titanium content and a zone of weldability. Alloys such as Inconel® 718 have relatively lower concentrations of these elements, and consequentially have relatively lower gamma prime content. These alloys are considered relatively weldable, although such welding is generally limited to low stress regions of a component. However, alloys such as Inconel® 939 have relatively higher concentrations of these elements, and thus are generally not considered to be weldable or can be welded only with special procedures which increase the temperature/ductility of the material and/or which minimize the heat input of the process. A dashed line 24 indicates a recognized upper boundary of a zone of weldability. The line 24 intersects 3 wt. % aluminum on the vertical axis and 6 wt. % titanium on the horizontal axis. Alloys outside the zone of weldability are recognized as being very difficult or impossible to weld with known processes, and the alloys with the highest aluminum content are generally found to be the most difficult to weld, as indicated by the arrow 25. In other embodiments, the substrate 12 may comprise a ceramic material.

The substrate 12 is typically, though not necessarily, a component of a gas turbine such as a gas turbine blade, but may alternatively be any component which would benefit from being subjected to the processes as described herein. The superalloy powder 16 typically comprises a composition similar to that of the substrate 12, such as a superalloy with a composition similar to that of the base substrate 12. In this way, the superalloy powder 16 is metallurgically compatible with the substrate 12. In certain embodiments, the superalloy powder 16 is suspended within a carrier.

The processes described herein, such as that in FIG. 1, may take place under appropriate flux conditions to shield the melt pool 22 from atmospheric oxygen. In certain embodiments, the processes described herein may be performed in the presence of a flowing stream of argon or other inert gas which shields the melt pool 22 from atmospheric oxygen.

In other embodiments, as shown in FIG. 1, the powder 14 may comprise a flux powder 28 of a size and composition as described in U.S. Published Patent Application No. 2013/0136868, the entirety of which is hereby incorporated by reference herein. The use of a flux powder 28 has a plurality of advantages associated therewith. In particular, when a melt pool 22 comprising the superalloy material 16, carbon reinforcing structures 18, and molten flux powder 16 is formed, a layer of slag 30 is formed at a top surface of the melt pool 22.

The layer of slag 30 provides a number of functions that are beneficial for preventing cracking of the cladding 10 and the underlying substrate 12. First, the layer of slag 30 may shield both the region of molten material and the solidified (but still hot) cladding 10 from the atmosphere in the region downstream of the energy source 20. In addition, the layer of slag 30 floats to the surface of melt pool 22 to separate the molten or hot metal from the atmosphere, and the flux powder 28 may be formulated to produce a shielding gas in some embodiments, thereby avoiding or minimizing the use of expensive inert gas. Second, the slag 30 acts as a blanket that allows the solidifying material to cool slowly and evenly, thereby reducing residual stresses that can contribute to post weld reheat or strain age cracking. Third, the slag 30 helps to shape the melt pool 22 to keep it close to a desired 1/3 height/width ratio. Fourth, the flux material 28 provides a cleansing effect for removing trace impurities such as sulfur and phosphorous that contribute to weld solidification cracking. Such cleansing may include deoxidation of the metal powder. Because the flux powder 28 is in intimate contact with the superalloy powder 16, the flux powder 28 may be especially effective in accomplishing this function.

Exemplary flux powders 28 which could be used in the processes described herein include commercially available fluxes such as those sold under the names Lincolnweld P2007, Bohler Soudokay NiCrW-412, ESAB OK 10.16 or 10.90, Special Metals NT100, Oerlikon OP76, Sandvik 50SW or SAS1. The flux particles may be ground to a desired smaller mesh size range before use. In particular embodiments, the flux powder 28 is specially adapted for the particular superalloy material being processed as described in U.S. Published Patent Application No. 2013/0136868 or U.S. Provisional Patent Application Ser. No. 61/859,317 (filed Jul. 29, 2013, entitled "Flux for Laser Welding"), each of which is hereby incorporated by reference as if fully set forth herein. In an embodiment, the volume ratio of the flux to superalloy powder may be from 3:2 to 2:3, and in certain embodiments is 1:1.

FIG. 1 described an embodiment where the carbon reinforcing structures 18 were added to the powder material 14 prior to melting of the powder 14 by an energy source 20, e.g., laser beam. It is understood, however, that the formation of a cladding comprising the carbon reinforcing structures 18 is not so limited to this method. Various methods may be utilized to form a carbon reinforced cladding, including adding the carbon structures 18 to a melt pool 22 comprising at least the superalloy powder 16, and optionally a flux powder 28 as described herein. For example, any of the methods described in U.S. Published Patent Application No. 2013/013868, the entirety of which is incorporated by reference, may be utilized herein to form a melt pool comprising at least a superalloy material and a plurality of carbon reinforcing structures 18, which may be cooled to form a reinforced cladding 10.

Figure 3:
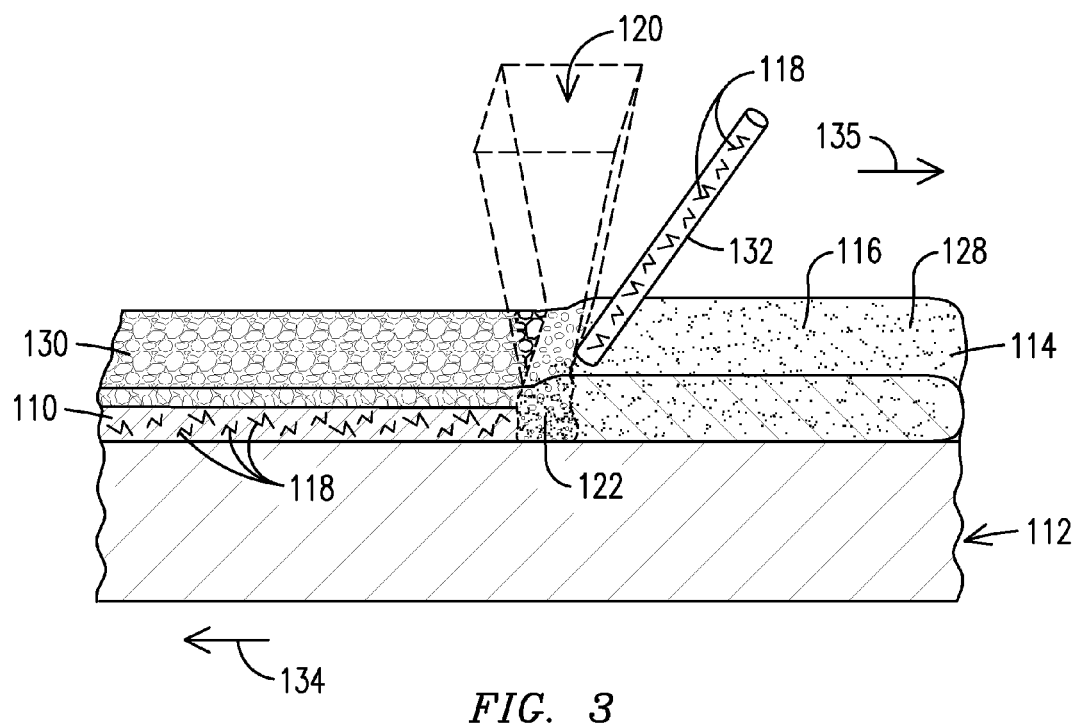
FIG. 3 illustrates a cladding process wherein carbon reinforcement structures are fed into a melt pool of superalloy material and flux material in accordance with an aspect of the present invention.

For example, FIG. 3 shows an embodiment wherein carbon reinforcing structures are added to a melt pool after the melt pool is established. By "established," it is meant that the melt pool 122 is at least 90% melted, and in certain embodiments, completely melted before the discrete carbon reinforcement structures are added externally from the melt pool 122. In certain embodiments, the carbon reinforcement structures 118 are introduced into the melt pool 122 after the application of energy from the energy source 120 is stopped, but before the melt pool 122 solidifies.

In other embodiments, the carbon reinforcement structures 118 are introduced into the melt pool 122 before the application of energy from the energy source is stopped, but still after the melt pool has been established and before the melt pool solidifies. It is further appreciated that the term "stopped" includes not only ceasing any deliverance of energy from the energy source 120, but also reducing the degree or extent of energy delivered to a level insufficient to melt the superalloy material 116. Pulsing on and then completely or incompletely off of the laser energy represents examples of such stoppage. One advantage of adding the carbon reinforcement structures 118 after the melt pool 122 is established is that the duration to which the carbon structures 118 are subject to energy exposure is substantially reduced. When a laser energy source is utilized, for example, adding the carbon structures after the melt is already established will substantially reduce the likelihood that the carbon reinforcing structures themselves will melt or be structurally damaged through absorption of the laser energy.

In the embodiment shown, a powder material 114 comprising a superalloy material (such as a superalloy powder 116) and a flux powder 128 is pre-placed or otherwise fed onto a surface of a substrate 112 as a homogeneous layer comprising the superalloy powder and the flux powder. In this embodiment, the superalloy powder 116 and flux powder 128 are mixed, but it is understood that the superalloy powder 116 and flux powder 128 may be supplied as separate layers as was shown in FIG. 1. Further alternatively, superalloy material may be provided as a feed material in the form of a wire or strip that is fed or oscillated to contribute to the melt pool 122 as explained in U.S. Published Patent Application No. 2013/0136868. It is also understood that a conventional inert gas may be utilized as the flux instead of the described flux powder in any of the embodiments described herein.

Upon being subjected to a suitable energy source 120, such as a laser source, the powder material 114 is melted to form a melt pool 122 on a surface of the substrate 112. Prior to the solidification of the melt pool 122 to form a cladding, a plurality of carbon reinforcing structures 118 are fed into the melt pool 122 from carbon reinforcing structure feed 132. Any suitable method may be utilized for introducing the carbon structures into the melt pool 122 from the feed 132, such as by propelling the plurality of carbon reinforcing structures 118 toward the surface of the substrate 112 via a jet of gas. The gas is preferably an inert gas such as argon, however, air or nitrogen may also be useful, especially if flux is alternately providing shielding of the melt. It is appreciated that one skilled in the art would readily be able to determine the parameters for introducing and dispersing the carbon reinforcing structures 118 into the melt pool 122, such as the gas volume, velocity, duration, and the like.

Once introduced into the melt pool 122, the carbon reinforcing structures 118 may be mixed within the melt pool 122 due to swirling of the melt pool 122. The mixing may be enabled by the melting of the powder and the impact of the feed gas from feed 132 on the melt pool 122. Once the carbon reinforcing structures 118 are introduced to the melt pool 122, the melt pool 122 is then allowed to cool, passively or actively, to provide the reinforced cladding 110 on a surface of the substrate 112. As shown in FIG. 3, to complete the additive manufacturing process, the substrate 112 may be moved to the left as shown by arrow 134 relative to the energy source 120 and the feed 132 (which may move collectively together). Alternatively, the energy source 120 and the feed 132 may be moved to the right as shown by arrow 135 as the substrate 112 is kept stationary to produce the reinforced cladding 110 over the complete intended area of the substrate 110. As was described previously with respect to FIG. 1, when a melt pool 122 comprising molten superalloy material 116, the carbon reinforcing structures 118, and molten flux powder 128 is formed, the melt pool 122 may solidify to form a layer of slag 130 over a reinforced cladding 110.

Figure 4:
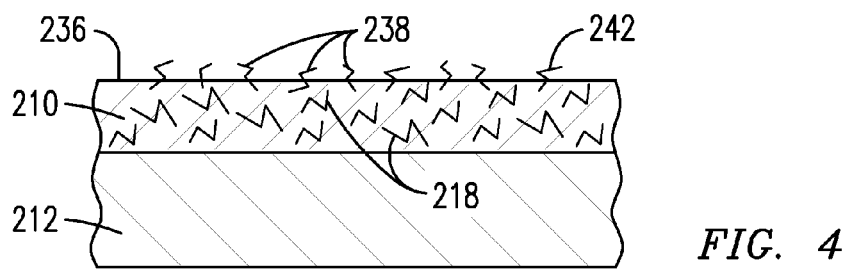
FIG. 4 illustrates a cladding comprising a plurality of carbon reinforcing structures projecting from an upper surface thereof in accordance with an aspect of the present invention.

In some embodiments, as shown in FIG. 4, the reinforced cladding is formed in such a manner that at least a portion of some of the carbon reinforcing structures project radially outward from a top surface of the reinforced cladding. As shown in FIG. 4, for example, the cladding 210 comprises a plurality of reinforcing structures 218, including at least a portion of which project from a top surface 236 of the cladding 210 (projecting carbon structures 238). Advantageously, the projecting carbon reinforcing structures 238 may act as anchors for the application of subsequent coatings on the substrate 212, such as a bond coat or thermal barrier coating (TBC). In particular, the presence of the projecting carbon reinforcing structures 238 may improve adhesion of the subsequent coating to the substrate 212 and may aid in preventing spallation between the subsequent coating and the substrate 212.

It is appreciated that the projecting carbon reinforcing structures 238 shown in FIG. 4 may be formed by any suitable method in the art, such as by introducing the carbon reinforcing structures 118 to the melt pool 122 (as in the embodiment of FIG. 3) at such a low speed that a portion of the carbon reinforcing structures 118 do not enter an interior of the melt pool 122, and/or by introducing at least some carbon structures 118 into the melt pool 122 at a point in time where the melt pool 122 is sufficiently close to solidification such that the carbon structures do not fully become mixed into an interior of the melt pool 122, but project from an outer surface.

Figure 5:
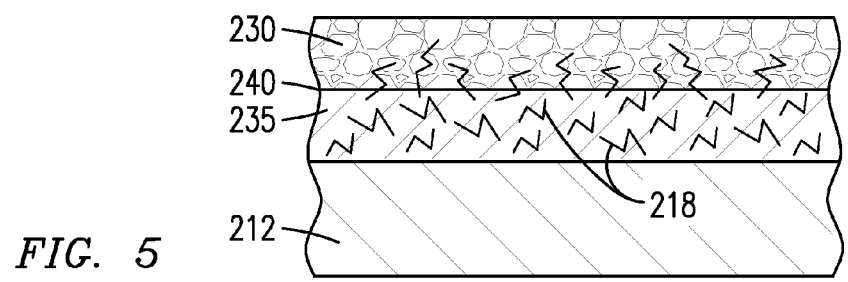
FIG. 5 illustrates carbon reinforcing structures at an interface between molten superalloy and slag in the melt pool in accordance with an aspect of the present invention.

In other embodiments, the presence of a layer of molten flux/slag 230 on the melt pool 222 may serve to suspend at least some of the carbon reinforcing structures 238 in a position, wherein they span the interface 240 between the molten superalloy 235 in the melt pool 222 (which forms the cladding 210 upon solidification) and the slag 230 as shown in FIG. 5. As shown in FIG. 5, the carbon structures 238 extend from the molten superalloy 235 and into the slag 230 above the melt pool 222. When the slag 230 is removed, exposed ends 242 of the carbon structures 238 are revealed. In particular, the slag 230 may be removed without removing the carbon structures 238 anchored in and extending from the superalloy melt to provide carbon structures 238 freely projecting from the cladding 210 upon cooling of the melt pool 222 as shown in FIG. 4.

The slag 230 may be removed using any suitable method known in the art. It is appreciated that the slag 230 is typically a solid layer that is substantially brittle. In certain embodiments, the slag 230 may be broken by mechanical methods, such as by cracking the slag 230 with a blunt object or vibratory tool, and sweeping away the slag 230 from the cladding 210. In other embodiments, the slag 230 (once formed) may be of such characteristic to self-detach upon cooling.

In the embodiments described herein, the energy source may comprise a diode laser beam having a generally rectangular cross-sectional shape, although other known types of energy beams may be used, such as electron beam, plasma beam, one or more circular laser beams, a scanned laser beam (scanned one, two or three dimensionally), an integrated laser beam, or the like. The rectangular shape may be particularly advantageous for embodiments having a relatively large area to be clad, such as for repairing the tip of a gas turbine engine blade.

It is further understood that in some embodiments the above-described cladding processes may be repeated two or more times to selectively form a cladding comprising several layers, each layer formed by forming a melt pool comprising at least a superalloy material and carbon reinforcing structures. When a flux powder is included in the process, each layer of slag formed may be removed by known processes prior to proceeding with the addition of the subsequent layer.

The processes described herein may be useful for original equipment manufacturing or for rapid prototyping of parts. Furthermore, the processes described herein may be used for component repair applications, such as for forming a replacement blade tip on a gas turbine blade that has been removed from service for refurbishing. Advantageously, the carbon reinforcing structures provide added stability to the final product. Also, in certain embodiments, the carbon reinforcing structures beneficially do not melt and are not structurally damaged even if exposed to the high energies utilized during laser melting, for example.

In other embodiments, high temperature materials other than carbon may be useful for particular applications and thus added to the melt pool along with the carbon reinforcing structures. For example, a zirconia material, such as zirconia fibers may be incorporated within the melt and offer properties alternate to carbon, especially providing thermally insulative rather than thermally conductive properties.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:
forming a melt pool comprising a superalloy material and a plurality of discrete carbon reinforcing structures on a superalloy substrate via application of energy from an energy source; and
cooling the melt pool to form a reinforced cladding comprising the superalloy material and the carbon reinforcing structures on the substrate.

2. The method of claim 1, wherein the forming a melt pool is done by:
melting a powder comprising the superalloy material and a powdered flux material via the energy source; and
introducing the plurality of discrete carbon reinforcing structures into the melt pool after the melt pool has been established.

3. The method of claim 2, wherein the introducing is done after the application of energy from the energy source is stopped, but before the melt pool solidifies.

4. The method of claim 2, wherein the introducing is done before the application of energy from the energy source is stopped, but after the melt pool has been established and before the melt pool solidifies.

5. The method of claim 2, wherein the introducing is done by propelling the plurality of carbon reinforcing structures toward the surface by a jet of gas.

6. The method of claim 1, wherein the forming a melt pool is done by subjecting a powder comprising the superalloy material, a powdered flux material, and the plurality of discrete carbon reinforcing structures to energy from the energy source, and wherein the cooling produces a removable layer of slag on the melt pool.

7. The method of claim 1, further comprising introducing a portion of the carbon reinforcing structures to the melt pool at a point in time and/or at a speed such that the formed reinforced cladding comprises carbon structures that project outward from a surface of the cladding.

8. The method of claim 1, wherein the carbon structures comprise a member selected from the group consisting of a fullerene structure, a carbon yarn, a carbon fiber, a carbon nanobud, a graphene structure, a diamond-like material, and a combination thereof.

9. The method of claim 1, wherein the energy source is a laser energy source, wherein the carbon reinforcing structures comprise nanosized carbon structures.

10. The method of claim 9, wherein the nanosized carbon structures comprise a nanoyarn material.

11. The method of claim 1, further comprising adding a zirconia material to the melt pool.

12. A method comprising:
forming a melt pool from at least a superalloy material and a flux powder on a superalloy substrate via application of energy from an energy source;
after the melt pool has been established and before solidification of the melt pool, introducing a plurality of carbon reinforcing structures to the melt pool; and
cooling the melt pool to form a reinforced cladding comprising the superalloy material and the carbon reinforcing structures on the substrate.

13. The method of claim 12, wherein the introducing is done after the application of energy from the energy source is stopped, but before the melt pool solidifies.

14. The method of claim 12, wherein the introducing is done before the application of energy from the energy source is stopped, but after the melt pool has been established and before the melt pool solidifies.

15. The method of claim 12,
wherein a layer of slag forms on a top surface of the melt pool as a result of the flux powder;
wherein at least some of the carbon structures are disposed across an interface between the slag and the molten alloy and extend from the molten superalloy into the slag; and
further comprising removing the layer of slag without removing the carbon structures anchored in and extending from the cladding to provide carbon structures freely projecting from the cladding upon cooling of the melt.

* * * * *